No. 792,554. PATENTED JUNE 13, 1905.
M. POTTER.
VEHICLE BRAKE BLOCK.
APPLICATION FILED FEB. 10, 1905.
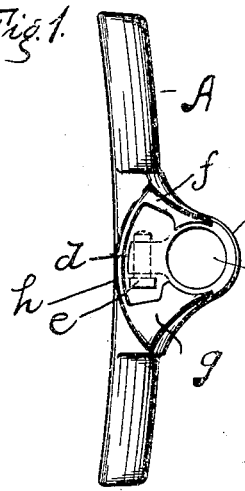
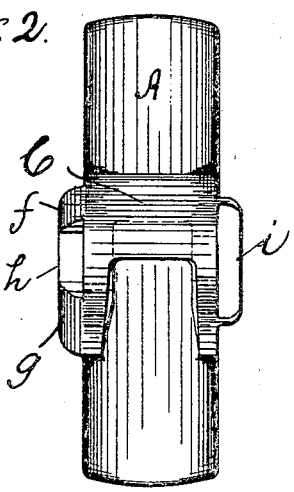
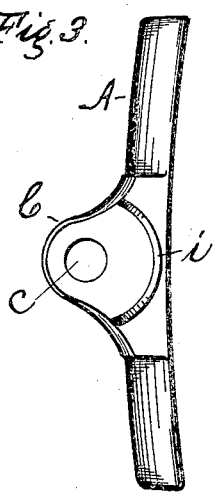
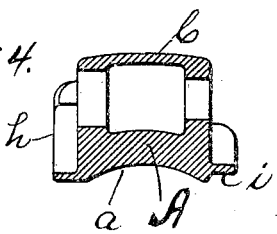
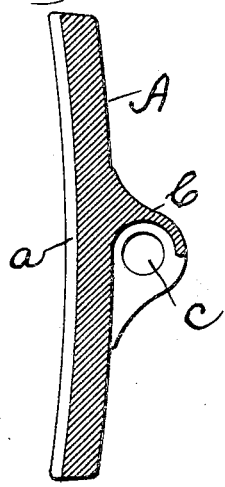
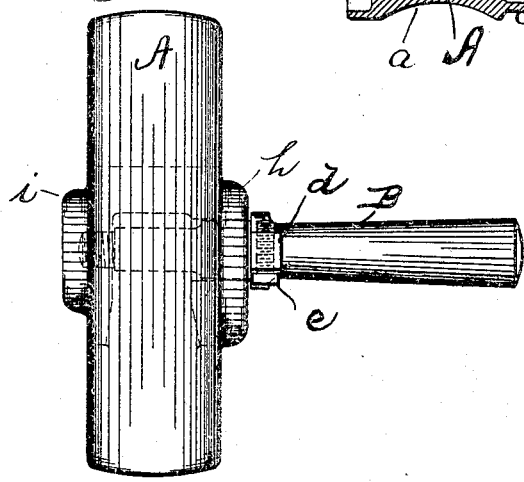
Witnesses:
L. H. Grote.
Geo. H. Marshall
Inventor:
Morgan Potter
by Worth Osgood,
Atty.

No. 792,554.

Patented June 13, 1905.

UNITED STATES PATENT OFFICE.

MORGAN POTTER, OF FISHKILL-ON-THE-HUDSON, NEW YORK, ASSIGNOR TO MORGAN POTTER COMPANY, OF FISHKILL-ON-THE-HUDSON, NEW YORK, A CORPORATION.

VEHICLE BRAKE-BLOCK.

SPECIFICATION forming part of Letters Patent No. 792,554, dated June 13, 1905.

Application filed February 10, 1905. Serial No. 245,012.

*To all whom it may concern:*

Be it known that I, MORGAN POTTER, a citizen of the United States, residing at Fishkill-on-the-Hudson, in the county of Dutchess and State of New York, have invented certain new and useful Improvements in Vehicle Brake-Blocks, of which the following, taken in connection with the accompanying drawings, is a full, clear, and exact specification sufficient to enable others to practice and use my said invention.

My present invention has relation chiefly to that variety of brake-blocks which are employed in connection with the wheels of wagons, carriages, and other vehicles, which blocks are sustained upon their shafts in such manner as to avoid contact with the wheel or its tire except at such times as the blocks are purposely brought into position for action by shifting the position of their shafts. The blocks are usually thus maintained on their shafts by springs which tend to keep the tops of the blocks out of the way of the wheel-tires when the blocks are not intended to be applied against the wheels; but they might be otherwise maintained for the like purpose to prevent unnecessary wear.

My present invention also is especially advantageous for use in connection with brake-blocks intended to bear against elastic or yielding tires, such as rubber tires, either of the solid or pneumatic pattern; but, as will appear hereinafter, the improvements herein referred to may be applied on blocks suitable for use in connection with other forms of tires.

The object of this invention is primarily to prevent damage to the yielding forms of tire, which, being movable as well as elastic or yielding, are liable to be compressed by the bearing thereon of the block, and thus to reach beyond the face thereof so as to come in contact with the adjacent portions of the brake-block appliance which are not movable, and therefore to become cut or damaged.

Subordinate objects are to strengthen the blocks and to add stability to the parts thereof and to prevent undue accumulation of dust or dirt or other foreign substances in or around the bearings of the fixed and movable parts by which undue wearing of the bearings might be occasioned.

To accomplish these objects and to secure other and further advantages in the matters of construction, operation, and use, my improvements consist in the application to or the construction with the brake-block of suitable permanent guards on either or both sides of the brake-block and at the proper points and the union of one of said guards with the abutments, by which the latter and the brake-block are stiffened or strengthened without in any way interfering with the proper operation of the block.

In the accompanying drawings, forming part of this specification, I have selected for illustration one pattern of block which has a concaved face and open back; but it should be understood that the particular style or pattern of the block is not essential and may be varied. For instance, the face need not be concaved, the back need not be open, and the block itself need not be of a single piece, but may be supplied with a wearing-shoe, as is sometimes done.

Figure 1 is a side elevation of a brake-block, showing one of the guards in connection with the abutments on one side of the block, the position of the screw-stop between these abutments being indicated by dotted lines. Fig. 2 is a rear elevation of the block shown in Fig. 1, omitting the brake-block shaft. Fig. 3 is an elevation of the side opposite that shown in Fig. 1. Fig. 4 is a horizontal section corresponding with Fig. 2 and on a plane through the axis of the bearings for the brake-block shaft. Fig. 5 is a vertical section and elevation through the central part of the brake-block shown in Fig. 1. Fig. 6 is a view in elevation showing the bearing-face of the block and the brake-block shaft with its stop-screw partly withdrawn from its bearings within the block.

In the several figures like letters of reference wherever they occur indicate corresponding parts.

A is the body of the brake-block, which, as before pointed out, may be of any desired pattern. It is usually of cast metal, and in the form shown it has a slightly-concaved bearing-face, as at *a a*, which is preferable in case the block is intended to be used against a rubber or other compressible tire.

B is the brake-block shaft, which is fitted to enter the bearings provided for it in the block and represented at *b* and *c*.

C is one form of housing on the back of the block by which the block-spring (not shown) is usually protected.

The brake-block shaft in the form shown is supplied with a projection *d*, which carries a stop-screw *e*, and when the block is properly located on the shaft this stop-screw limits the turning movement of the block on the shaft, being struck by one or the other of the abutments *f* or *g* with which the block is supplied on the adjacent side.

The block being secured upon its shaft and being forcibly pressed against a compressible tire, the latter is compressed at the points where the block contacts with it, and it bulges out or extends beyond the limits of the bearing-face of the block, where it might come in contact with the projection *d* or with the stop-screw *e* on one side or with the nut by which the block is held upon its shaft on the other side, and thus the tire be damaged or torn. To obviate this, I supply the block on one side with a guard *h*, and this is made to extend from one abutment *f* to the other, *g*, and it is most conveniently and preferably cast integrally with the block and the abutments, leaving a space open on one side sufficient to admit and accommodate the stop-screw and permit the necessary turning movements of the block upon its shaft. The guard is of depth sufficient to cover the stop-screw and the projection in which it is located. On the opposite side of the block I form or apply another guard *i*, which is of depth sufficient to cover the nut or other appliance on the end of the brake-block shaft, by which the block is held in place on such shaft.

Neither of the guards project beyond the bearing-face of the block, and either of them is sufficient to prevent any possible contact of the tire with projecting portions of the shaft or its appendages, by which the tire might be damaged. Either of the projecting guards will also operate to protect the points at which the block bears on the shaft against accumulation of dirt or foreign substances, and when they or either of them are cast integrally with the block they serve to strengthen and stiffen the same. The guard *h*, which unites the two abutments, tends to resist the strain on either one, and therefore they may, if desired, be made lighter than they otherwise would need to be. When in place, the guards in no way interfere with the application of the block to the shaft or its removal therefrom or with the operation of the block, and the block, with the guards, may of course be used in any situation or in connection with any particular form of tire the same as if the guards were not present.

Being constructed and arranged substantially in accordance with the foregoing explanations, my improvements will be found to admirably answer all the purposes or objects of the invention hereinbefore alluded to.

Having now fully described my invention, what I claim as new herein, and desire to secure by Letters Patent, is—

1. The combination with a brake-block shaft having a stop-screw for the block, of a brake-block mounted on said shaft and having a projecting guard on its side, substantially as and for the purposes set forth.

2. In a brake-block of the character herein set forth, the combination with the block of abutments on one side for bearing against a stop on the brake-block shaft and projecting guards on each side to protect the bearings for the shaft in the block, substantially as and for the purposes explained.

3. In a brake-block arranged to be mounted upon a brake-block shaft and made movable thereon, the combination with the abutments on one side of said block, of a projecting guard connecting the said abutments, substantially as shown and for the purposes set forth.

4. The herein-described brake-block consisting of a body having bearings for a brake-block shaft, abutments on one side of the block, and projecting guards on each side, the parts being arranged and combined substantially as shown and for the purposes set forth.

In testimony whereof I have signed my name to this specification in the presence of two subscribing witnesses.

MORGAN POTTER.

Witnesses:
M. E. CURTISS,
I. B. CAMMACK.